United States Patent
Soderlind et al.

(10) Patent No.: US 10,259,487 B2
(45) Date of Patent: Apr. 16, 2019

(54) STEERING COLUMN FLEXIBLE COVER STANDOFF

(71) Applicant: Ford Global Technologies, LLC, Dearborn, MI (US)

(72) Inventors: Erik William Soderlind, Harrison Township, MI (US); Taras Palczynski, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 42 days.

(21) Appl. No.: 15/677,777

(22) Filed: Aug. 15, 2017

(65) Prior Publication Data

US 2019/0054949 A1    Feb. 21, 2019

(51) Int. Cl.
*B62D 1/19*    (2006.01)
*B62D 1/187*    (2006.01)

(52) U.S. Cl.
CPC ............. *B62D 1/195* (2013.01); *B62D 1/187* (2013.01); *B62D 1/19* (2013.01)

(58) Field of Classification Search
CPC ........... B62D 1/195; B62D 1/187; B62D 1/19
See application file for complete search history.

(56) References Cited

U.S. PATENT DOCUMENTS

| | | | |
|---|---|---|---|
| 5,390,955 A | 2/1995 | Kaliszewski et al. | |
| 5,673,938 A | 10/1997 | Kaliszewski | |
| 6,398,259 B1 | 6/2002 | Palmer et al. | |
| 7,703,804 B2 | 4/2010 | Cymbal et al. | |
| 8,544,887 B2 * | 10/2013 | Fujiwara | B62D 1/195 280/777 |
| 2004/0232685 A1 * | 11/2004 | Gatti | B62D 1/195 280/777 |
| 2007/0228716 A1 | 10/2007 | Menjak et al. | |
| 2010/0300238 A1 * | 12/2010 | Ridgway | B62D 1/184 74/493 |
| 2016/0288820 A1 * | 10/2016 | Myohoji | B62D 1/195 |
| 2017/0113711 A1 * | 4/2017 | Matsuno | B62D 1/19 |
| 2018/0009463 A1 * | 1/2018 | Yoshihara | B62D 1/184 |
| 2018/0093697 A1 * | 4/2018 | Forte | B62D 1/195 |
| 2018/0346013 A1 * | 12/2018 | Abramoski | B62D 1/19 |

FOREIGN PATENT DOCUMENTS

| | | |
|---|---|---|
| CN | 202783335 | 3/2013 |
| JP | 2005053349 | 3/2005 |
| WO | 2012090616 | 7/2012 |

* cited by examiner

*Primary Examiner* — Karen Beck
(74) *Attorney, Agent, or Firm* — Ray Coppiellie; Hanley, Flight & Zimmerman, LLC

(57) ABSTRACT

Methods, apparatus, systems and articles of manufacture are disclosed for a standoff to be coupled to a telescoping steering column, the standoff configured to be mounted adjacent an end stop opening in the steering column and to prevent a flexible cover mounted above the steering column from entering the end stop opening.

21 Claims, 4 Drawing Sheets

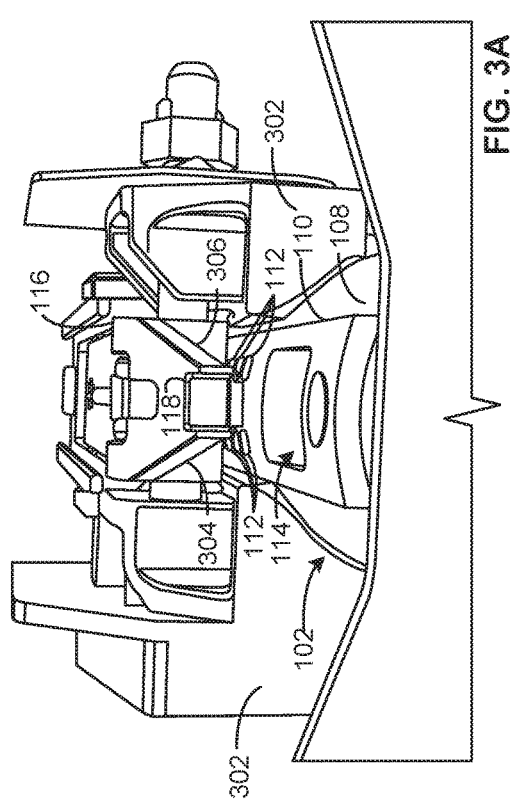
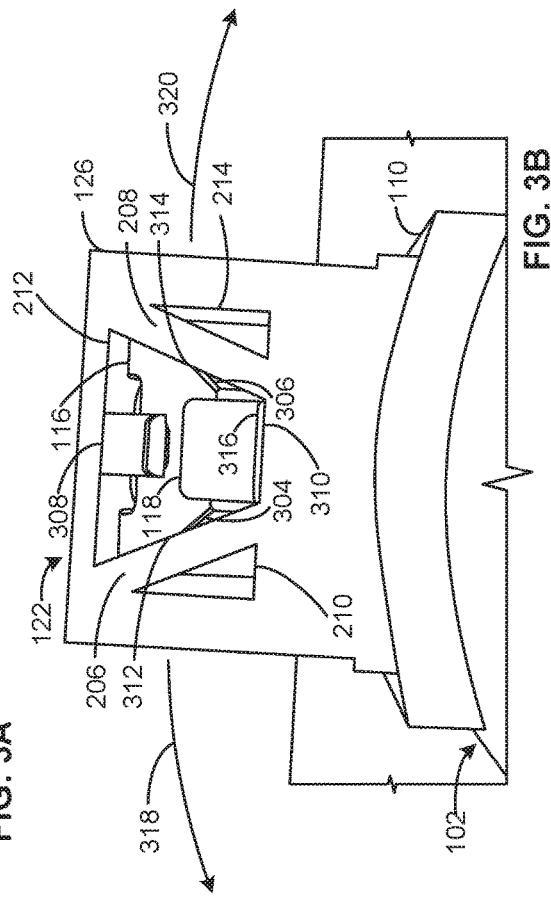

STEERING COLUMN FLEXIBLE COVER STANDOFF

FIELD OF THE DISCLOSURE

This disclosure relates generally to vehicles and, more particularly, to a steering column flexible cover standoff.

BACKGROUND

Vehicle steering systems may implement a steering column to transmit a rotational input at a steering wheel and/or other input device of a vehicle to a rotational output at one or more wheel assemblies of the vehicle. Often, to meet safety and functional requirements, steering columns must be capable of collapsing in the event of a crash and/or frontal impact to the vehicle and include a cover to isolate the user of the vehicle from the steering column assembly.

Additionally, to meet demands relating to user comfort in modern vehicles, many modern steering columns are capable of telescoping to allow the user to translationally adjust a position of a steering wheel and/or other input device coupled to the steering column. For steering columns capable of telescoping, the steering column assembly cover must be flexible to allow for translational adjustment of the steering column.

SUMMARY

A steering column flexible cover standoff is disclosed herein. An example apparatus comprises a standoff coupled to a steering column, the standoff to be positioned adjacent an upwardly facing opening of the steering column, the opening associated with a telescoping operation of the steering column, and wherein the standoff is to prevent a flexible panel to be located above the opening from entering the opening.

Another example apparatus comprises a standoff to be coupled to a telescoping steering column, the standoff configured to be mounted adjacent to an end stop opening in the steering column and to prevent a flexible cover mounted above the steering column from entering the end stop opening.

Another example apparatus comprises a vehicle having a telescoping steering column, the steering column including an upwardly facing telescope end stop opening, a rigid shroud extending over a portion of the steering column, a flexible cover coupled to the shroud and extending toward the end stop opening, a standoff positioned between the cover and the steering column to prevent the flexible cover from entering the opening, and a lever arm to breakaway the standoff as a result of a stroke event of the steering column.

BRIEF DESCRIPTION OF THE DRAWINGS

FIG. 3A illustrates a view of an end stop lever arm of the steering column assembly when the example standoff is not shown.

FIG. 3B illustrates a view of the end stop lever arm of the steering column assembly when the example standoff is shown.

Figure 1:
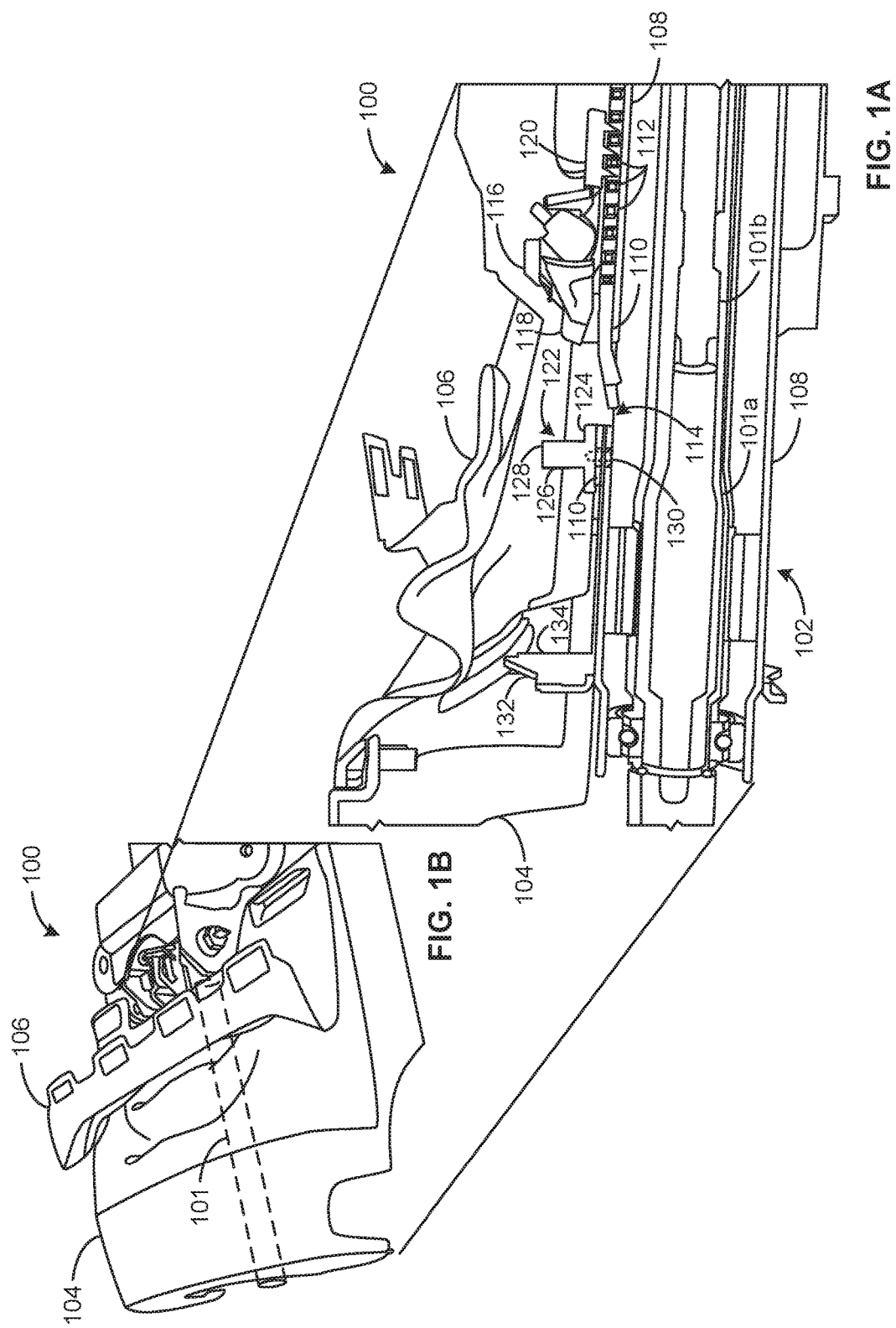
FIG. 1A is a side view of an example steering column assembly mounted to an example steering system that is capable of implementing the teachings of this disclosure including an example standoff in accordance with the teachings of this disclosure.
FIG. 1B is a perspective view of a portion of the example steering column of FIG. 1A.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located there between. Stating that any part is in contact with another part means that there is no intermediate part between the two parts.

DETAILED DESCRIPTION

Vehicle steering systems can implement conventional steering columns known to be capable of, to meet safety and functional requirements, collapsing in the event of a crash and/or frontal impact to the vehicle. Typically, vehicle steering systems also include a cover to isolate the user of the vehicle from the steering column assembly.

Conventional steering columns often incorporate telescoping functionality (e.g., telescoping operation) to meet user comfort demands. As used herein, steering columns capable of telescoping are referred to as "telescoping steering columns," and allow the user of the vehicle to translationally adjust a position of a steering wheel and/or other input device. Additionally, telescoping steering columns can define an end stop recess (e.g., a hole, an opening, an aperture, an upwardly facing opening, a telescope end stop opening, etc.) to engage a stop lever arm, further defining at least one of a minimum or maximum extent of allowable translational adjustment of the steering column.

Vehicle steering systems implementing telescoping steering columns can also include a cover to isolate the user of the vehicle from the telescoping steering column. However, unlike the cover for a fixed or non-telescoping steering column, the cover for a telescoping steering column is flexible (e.g., a flexible cover, a flexible panel, etc.) to ensure coverage of the telescoping steering column at each of a minimum extent of translational adjustment and a maximum extent of translational adjustment.

The flexible cover can enter a recess defined by the telescoping steering column and prohibit an end stop lever arm from engaging the recess. As a result, the telescoping steering column may translate past at least one of a minimum extent of translational adjustment or maximum extent of translational adjustment. This may further prohibit a positive lock mechanism of the steering column from engaging, thereby allowing the steering column to free stroke and raise safety concerns. Additionally, in a crash event and/or frontal impact, due to collapse of the steering column (e.g., a stroke event), the end stop lever arm may translate along the steering column to a wall of a steering console control module.

Examples disclosed herein isolate a flexible cover from a recess in a steering column. More specifically, the examples serve to prevent the flexible cover from entering an end stop recess and prohibiting a telescoping end stop lever arm from engaging an end stop recess during a telescoping adjustment of the steering column and/or a positive lock mechanism from engaging. As will be set forth in greater detail below, the examples described herein provide a standoff coupled to the telescoping steering column, adjacent a recess included in the telescoping steering column, to prevent the flexible cover from entering the recess. Additionally, the standoff is to separate (e.g., breakaway) from the steering column during collapse of the steering column to allow the stop lever arm to translate to the wall of a steering console control module, at which point collapse of the steering column is complete.

In some examples, the standoff includes a first portion extending outward from the telescoping steering column. In some examples, the standoff further includes a second portion extending away from the first portion along a longitudinal axis of the telescoping steering column to cover some or all of the recess in the telescoping steering column. In some examples, the first portion of the standoff further defines a body to engage a surface of the end stop lever arm, thereby promoting breakaway of the standoff in shear, away from the steering column, when impacted by the surface of the end stop lever arm.

As will be discussed in greater detail below in accordance with the teachings of this disclosure, the standoff can have various configurations and/or orientations, which may depend on a type of steering assembly and/or characteristics associated with the material properties of at least one of the flexible cover and/or the end stop lever arm. In examples disclosed herein, these configurations and/or orientations can be changed or altered to optimize at least one of isolation of the flexible cover from the recess in a steering column and/or breakaway of the standoff when impacted by the end stop lever arm.

Turning to the figures, FIGS. 1A and 1B illustrate an example steering column assembly 100 that is capable of implementing the teachings of this disclosure. The example steering column assembly 100 has one or more steering column shafts 101, further included in a steering column sub-assembly 102. In the illustrated example of FIGS. 1A and 1B, the steering column sub-assembly 102 includes two steering column shafts 101, further defined as steering column shaft 101a and steering column shaft 101b in FIG. 1A. In some examples, as in the illustrated example of FIGS. 1A and 1B, the steering column sub-assembly 102 is capable of telescoping and can be translationally adjusted by at least one of a user of a vehicle and an automated process. Additionally, in some examples such as in the illustrated example of FIG. 1A, the steering column shaft 101a is stationary relative to the steering column shaft 101b during normal operation of the vehicle, but can translate relative to the steering column shaft 101b due to collapse of the steering column during a crash event or frontal impact.

The steering column assembly 100 further includes one or more shrouds 104 and one or more flexible covers 106. In the illustrated example of FIGS. 1A and 1B, the steering column assembly 100 includes one shroud 104 and one flexible cover 106. In some examples, the shroud 104 is coupled to the flexible cover 106 such that the steering column sub-assembly 102 and any component thereof is not exposed to a user of a vehicle. Additionally, in some examples, the shroud 104 may be composed of a rigid material (e.g., a rigid shroud).

Further, as shown in FIG. 1A, the steering column sub-assembly 102 can include an upper jacket 108. In some examples, the upper jacket 108 is coaxial with at least one of the steering column shaft 101a and the steering column shaft 1b. The upper jacket 108 is coupled to a retaining plate 110 which defines one or more positive lock recesses 112 utilized for constraining the position of the upper jacket 108. The upper jacket 108 and the retaining plate 110 further defines an end stop recess 114 to act as an end stop for a telescoping adjustment of the steering column sub-assembly 102.

Further included in the steering column sub-assembly 102 is an end stop lever arm 116. In some examples, a user of the vehicle can unlock and/or lock the end stop lever arm 116. Further, an unlocked position of the end stop lever arm 116 allows the user to adjust the position of the steering column shaft 101 and the upper jacket 108 (e.g., rake, tilt, telescope, etc.). A locked position of the end stop lever arm 116, to be utilized during operation of the vehicle, locks at least one of the position and orientation of the upper jacket 108. Further, the end stop lever arm 116 can include a soft stop 118. In some examples, the soft stop 118 is to engage the end stop recess 114 during a telescoping adjustment of the upper jacket 108. Additionally, the soft stop 118 can be composed of a rubber compound. The telescoping adjustment, enabled when the end stop lever arm 116 is in the unlocked position, may enable the upper jacket 108 to be adjusted between a minimum extent (e.g., −25 millimeters, −40 millimeters, etc.) and a maximum extent (e.g., 25 millimeters, 40 millimeters, etc.), with the minimum extent being further defined by a position of the end stop recess 114 and the maximum extent being further defined by a position of a second end stop recess, not pictured.

Additionally, when the end stop lever arm 116 is in the locked position, the end stop lever arm 116 is to cause one or more positive lock teeth 120 to engage one or more of the positive lock recesses 112. During a crash event/front impact, the one or more positive lock teeth 120 engaging the one or more positive lock recesses 112 are to minimize translation of the steering column shaft 101 and the upper jacket 108 towards a user of a vehicle, ensuring that the steering column shaft 101 and the upper jacket 108 does not engage the user of the vehicle.

If the flexible cover 106 were to enter the end stop recess 114, at least one of the soft stop 118 and the one or more positive lock teeth 120 may be prevented from engaging the end stop recess 114 and the one or more positive lock recesses 112, respectively, causing a decrease in one or more safety metrics of the vehicle related to the steering column assembly 100.

Additionally, the steering column sub-assembly 102 includes a standoff 122 that extends away from at least one of the upper jacket 108 and retaining plate 110 and is located adjacent to the end stop recess 114. Additionally or alternatively, the standoff 122 can be located a distance along a longitudinal axis of the upper jacket 108 away from the end stop recess 114.

The standoff 122, in some examples, includes a base 124. The base 124 is in direct contact with the retaining plate 110. Coupled to the base 124 of the standoff 122 is a first portion 126. In some examples, the base 124 and the first portion 126 are integrally formed as one body. The first portion 126 extends a distance away from the retaining plate 110 (e.g., 0.5 inches, 1 inch, 3 inches, etc.), terminating at a distal end 128.

Further, the standoff 122 couples to at least one of the upper jacket 108 and retaining plate 110 via a fastener (e.g., lugs, bolts, nuts, rivets, plastic injection, etc.) 130, received by the base 124 of the standoff 122. Additionally or alternatively, any other suitable fastening method or technique (e.g., press fit, material interference, weld, etc.), such that at least one of the upper jacket 108, the retaining plate 110, and the standoff 122 can translate and/or rotate in tandem can be utilized. Additionally or alternatively, at least one of the upper jacket 108, the retaining plate 110, and the standoff 122 can be integrally formed as a unitary body. In some examples, the standoff 122 may be composed of a plastic material.

Additionally, a steering column control module 132 is included in the steering column sub-assembly 102 and is in contact with the upper jacket 108. In some examples, the steering column control module 132 includes a surface 134 extending outward from the steering column shaft 101. The surface 134 defines a maximum translation of the upper jacket 108 (e.g., 90 millimeters, 110 millimeters, etc.) during a stroke event as where the soft stop 118 engages the surface 134.

Figure 2:
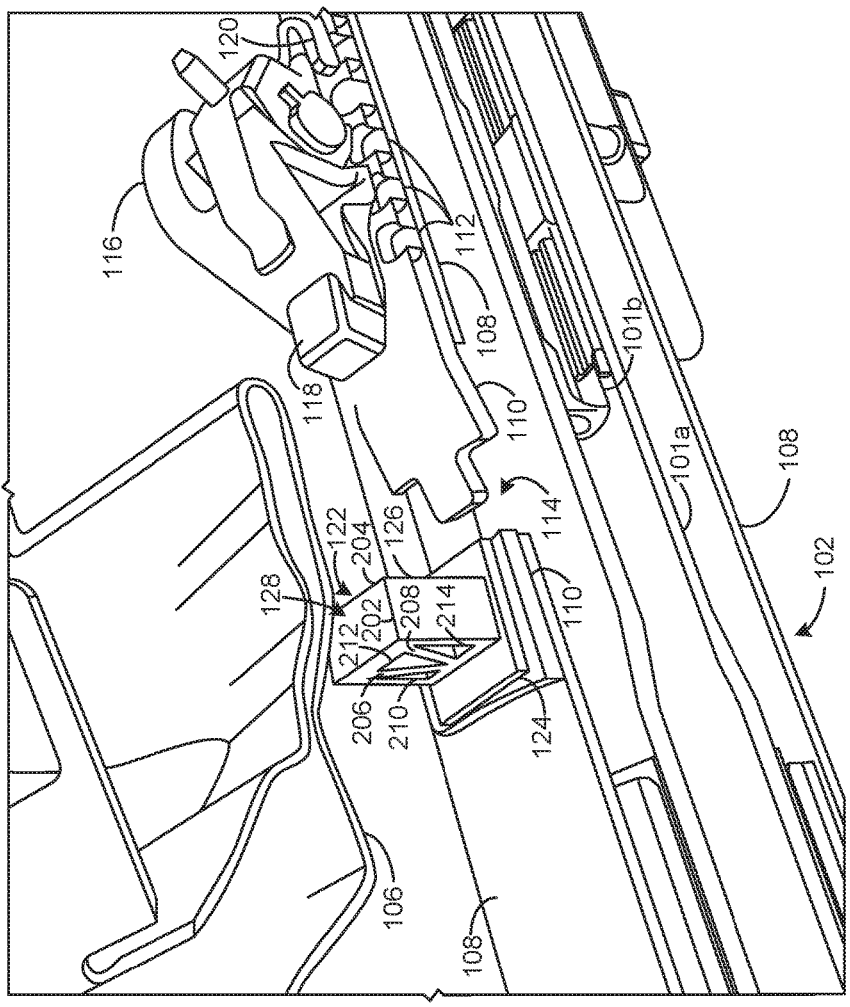
FIG. 2 is another view of the example steering column mounted to an example steering system including the example standoff of FIG. 1A.

FIG. 2 is another view of the example steering column sub-assembly 102 of FIGS. 1A and 1B. As shown in FIG. 2, a cross-section of the first portion 126 of the example standoff 122 can be at least partially defined by a rectangle having a length 202 and a width 204. Alternatively, the cross-section of the first portion 126 can be at least partially defined by a circle having a radius. Alternatively, the cross-section of the first portion 126 can be any shape suitable for isolating the flexible cover 106 from the end stop recess 114.

For the example standoff 122, the first portion 126 further defines each of a first angled ramp 206, and a second angled ramp 208, described in further detail in conjunction with FIG. 3B. Additionally, the first portion 126, the first angled ramp 206, and the second angled ramp 208 can further define a first aperture 210, a second aperture 212, and a third aperture 214, described in further detail in connection with FIG. 3B. In the illustrated example, the first portion 126 of the example standoff 122 includes three apertures (e.g., openings). In other examples, the first portion 126 can include additional or fewer apertures.

FIG. 3A is a view of the steering column sub-assembly 102, the upper jacket 108, the retaining plate 110, the one or more positive lock recesses 112, the end stop recess 114, the end stop lever arm 116, and the soft stop 118. However, for clarity, the example standoff 122 is omitted from FIG. 3A.

As shown in FIG. 3A, a steering column clamp 302 is coupled to the steering column sub-assembly 102. The steering column clamp 302, in response to a locked position of the end stop lever arm 116, applies a pressure to the upper jacket 108. The applied pressure prevents translation of the steering column sub-assembly 102 during normal operation of a vehicle, but is such that translation of the steering column sub-assembly 102 is possible during a crash event. Additionally, in response to an unlocked position of the end stop lever arm 116, the steering column clamp 302 is to remove the applied pressure from the upper jacket 108 to allow for translational adjustment of the steering column sub-assembly 102.

Additionally, the end stop lever arm 116, as illustrated in FIG. 3A, includes at least one of a first tapered surface 304 and a second tapered surface 306. In some such examples, at least one of the first tapered surface 304 and the second tapered surface 306 terminates at one or more surfaces of the soft stop 118. Additionally or alternatively, the first tapered surface 304 and the second tapered surface 306 can form a wedge, terminating at the soft stop 118. Additionally or alternatively, a taper of the first tapered surface 304 can be identical to a taper of the second tapered surface 306.

In some examples, such as the illustrated example of FIG. 3B, the first portion 126, the first angled ramp 206, and the second angled ramp 208 can define the second aperture 212 as a trapezoidal aperture (e.g., a tapered aperture) with a first surface 308, a second surface 310, a third surface 312, and a fourth surface 314. In some examples, the first surface 308 can be a major base, the second surface 310 can be a minor base, and the third surface 312 and fourth surface 314 can be legs of the trapezoidal aperture. Additionally, the first surface 308 can be substantially parallel to the second surface 310. Additionally, a length of the first surface 308 can be greater than a length of the second surface 310, wherein each length is taken extending from left to right in the view of FIG. 3B.

In response to a crash event/frontal impact, collapse of the steering column sub-assembly 102 (e.g., a stroke event) is caused by (in addition to translation of the steering column shaft 101a relative to the steering column shaft 101b) a translation of the upper jacket 108 relative to the steering column clamp 302. Additionally, translation of the upper jacket 108 relative to the steering column clamp 302 can cause the end stop lever arm 116 to translate relative to the standoff 122 and, in some examples, the end stop lever arm 116 is further to engage (e.g., impact) the example standoff 122. In such examples, the soft stop 118 can be further defined by a width 316, the width 316 extending from left to right in the view of FIG. 3B, that is less than the length of the second surface 310 and can enter the second aperture 212 without contacting the standoff 122.

Further, at least one of the first tapered surface 304 and second tapered surface 306 is to engage (e.g., impact) at least one of the third surface 312 defined by the first angled ramp 206 and the fourth surface 314 defined by the second angled ramp 208, respectively. As a result of the engagement, the example standoff 122 is to separate (e.g., break-away) from at least one of the upper jacket 108 and the retaining plate 110 due to fracture (e.g., shearing, shear failure, shear fracture, etc.) of the first portion 126. In some such examples, the separation caused by the engagement can cause the standoff 122, now separate from at least one of the upper jacket 108 and the retaining plate 110, to translate along a path extending away from the steering column sub-assembly 102. In some examples, such as the illustrated example of FIG. 3B, the example standoff 122 is to translate along at least one of a path 318 and a path 320. Additionally or alternatively, the example standoff 122 can translate along any path extending away from the steering column sub-assembly 102.

Figure 4:
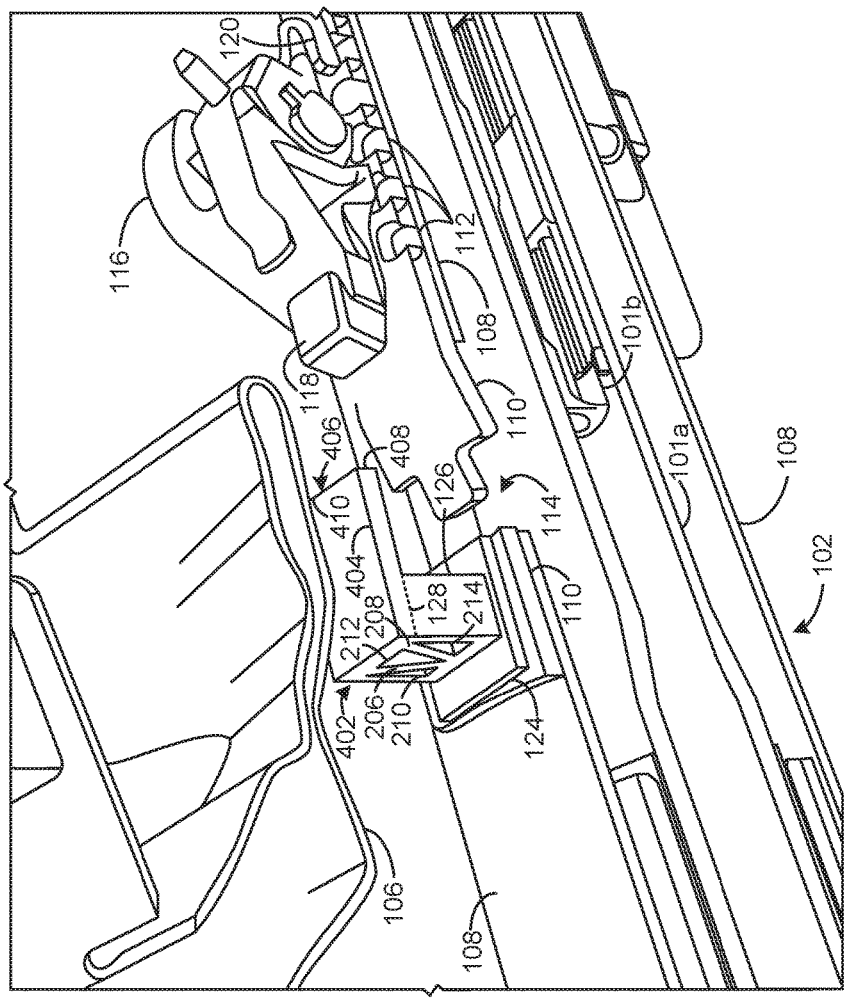
FIG. 4 illustrates the example steering column of FIG. 1A including an alternate example of a standoff in accordance with the teachings of this disclosure.

FIG. 4 is a view of the example steering column sub-assembly 102 of FIGS. 1A and 1B. However, FIG. 4 includes an alternative example standoff 402. The alternative example standoff 402 includes the base 124, the first portion 126, the distal end 128, the first angled ramp 206, the second angled ramp 208, the first aperture 210, the second aperture 212, and the third aperture 214 described above in connection with the example standoff 122 previously detailed in FIG. 2.

The alternative example standoff 402 of FIG. 4 further includes a second portion 404, extending along the upper jacket 108. In some examples, the second portion 404 is integrally formed to the distal end 128 of the first portion 126. The second portion 404 may extend a distance along a longitudinal axis of the upper jacket 108 (e.g., 0.5 inches, 1 inches, 3 inches, etc.) to cover all or only a portion of the end stop recess 114. In any case, the second portion 404 terminates at a distal end 406. The distal end 406 can further define a cross-section of the second portion 404. In some examples, the cross-section of the second portion 404 is identical to the cross-section of the first portion 126. Additionally or alternatively, the cross-section can be at least partially defined by a rectangle having a length 408 and a width 410. Additionally or alternatively, the cross-section can be at least partially defined by a circle having a radius. Additionally or alternatively, the cross-section can be any shape suitable for isolating the flexible cover 106 from the end stop recess 114.

As used herein, when the phrase "at least" is used as the transition term in a preamble of a claim, it is open ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

From the foregoing, it will be appreciated that example apparatus have been disclosed that prevent a flexible cover from entering an end stop recess, thereby ensuring the flexible cover does not prohibit at least one of a telescoping stop lever arm and one or more positive lock teeth from properly engaging respective mating surfaces.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a telescoping steering column having an end stop opening;
   a shroud extending over a portion of the end stop opening;
   a flexible cover coupled to the shroud and extending toward the end stop opening;
   a standoff coupled to the steering column adjacent the end stop opening, the standoff configured to prevent the cover from entering the end stop opening; and
   a lever arm configured to breakaway the standoff from the steering column in response to a stroke event of the steering column.

2. The apparatus of claim 1, wherein a first portion of the standoff extends away from the steering column.

3. The apparatus of claim 2, wherein the standoff includes a second portion extending away from the first portion of the standoff, the second portion of the standoff configured to cover the end stop opening of the steering column, the second portion of the standoff integrally formed to a distal end of the first portion of the standoff.

4. The apparatus of claim 2, wherein breakaway of the first portion of the standoff occurs in response to a shearing of the first portion of the standoff.

5. The apparatus of claim 4, wherein the first portion of the standoff defines a tapered aperture, the tapered aperture to engage a wedge at impact to cause the shearing of the first portion of the standoff.

6. The apparatus of claim 1, wherein the standoff is composed of a plastic material.

7. An apparatus comprising:
   a telescoping steering column having an end stop opening;
   a flexible cover mounted above the steering column and extending toward the end stop opening;
   a standoff coupled to the steering column adjacent the end stop, the standoff configured to prevent the flexible cover from entering the end stop opening; and
   a lever arm configured to separate the standoff from the steering column in response to a stroke event of the steering column.

8. The apparatus of claim 7, wherein the standoff includes a first portion extending away from the steering column when the standoff is mounted to the steering column.

9. The apparatus of claim 8, wherein the standoff includes a second portion integrally formed to a distal end of the first portion of the standoff, the second portion of the standoff extending away from the first portion of the standoff, the second portion of the standoff configured to cover the end stop opening of the steering column when the standoff is mounted to the steering column.

10. The apparatus of claim 8, wherein the first portion of the standoff defines an aperture configured to receive a portion of the lever arm at impact to cause the first portion of the standoff to separate from the steering column.

11. The apparatus of claim 7, wherein the standoff is coupled to the steering column by a fastener or a press fit.

12. An apparatus comprising:
    a telescoping steering column including an upwardly facing end stop opening;
    a rigid shroud extending over a portion of the steering column;
    a flexible cover coupled to the shroud and extending toward the end stop opening;
    a standoff positioned between the cover and the steering column to prevent the cover from entering the end stop opening; and
    a lever arm to breakaway the standoff as a result of a stroke event of the steering column.

13. The apparatus of claim 12, wherein a first portion of the standoff extends away from an axis of the steering column.

14. The apparatus of claim 13, wherein a second portion of the standoff, integrally formed to a distal end of the first portion of the standoff, extends along the steering column to cover the end stop opening.

15. The apparatus of claim 13, wherein the first portion of the standoff defines an aperture, the aperture extending along an axis substantially parallel to the axis of the steering column, the aperture having a taper aligned substantially parallel with a taper of a wedge of the lever arm, the wedge to engage the aperture at impact to cause breakaway of the first portion of the standoff.

16. The apparatus of claim 12, wherein the standoff is positioned adjacent to the end stop opening.

17. The apparatus of claim 12, wherein the standoff and the steering column are unitary.

18. An apparatus comprising:
    a standoff coupled to a steering column, the standoff positioned adjacent an upwardly facing opening formed in the steering column, the opening associated with a telescoping operation of the steering column, the standoff configured to prevent a flexible cover located above the opening from entering the opening, the standoff including a first portion extending away from the steering column, the first portion defining a tapered aperture; and
    a lever arm configured to breakaway the first portion of the standoff from the steering column in response to a stroke event of the steering column, the lever arm including a wedge configured to engage the tapered aperture to cause the first portion to breakaway from the steering column, the breakaway caused by a shearing of the first portion.

19. The apparatus of claim 18, wherein the standoff further includes a second portion extending away from the first portion of the standoff, the second portion of the standoff configured to cover the opening of the steering column.

20. An apparatus comprising:
   a standoff coupled to a telescoping steering column, the standoff mounted adjacent an end stop opening formed in the steering column, the standoff configured to prevent a flexible cover mounted above the steering column from entering the end stop opening, the standoff including a first portion extending away from the steering column, the first portion defining an aperture; and
   a lever arm configured to separate the first portion of the standoff from the steering column in response to a stroke event of the steering column, the lever arm including a portion configured to engage the aperture to cause the first portion to separate from the steering column.

21. The apparatus of claim 20, wherein the standoff further includes a second portion extending away from the first portion of the standoff, the second portion of the standoff configured to cover the end stop opening of the steering column.

\* \* \* \* \*